(12) United States Patent
Hündgen et al.

(10) Patent No.: US 12,172,225 B2
(45) Date of Patent: Dec. 24, 2024

(54) RESISTANCE SPOT WELDING ELECTRODE AND USE OF THE ELECTRODE

(71) Applicant: Outokumpu Oyj, Helsinki (FI)

(72) Inventors: Thomas Hündgen, Juechen (DE); Stefan Lindner, Willich (DE)

(73) Assignee: Outokumpu Oyj, Helsinki (FI)

( * ) Notice: Subject to any disclaimer, the term of this patent is extended or adjusted under 35 U.S.C. 154(b) by 980 days.

(21) Appl. No.: 16/308,112

(22) PCT Filed: Jun. 9, 2017

(86) PCT No.: PCT/EP2017/064143
§ 371 (c)(1),
(2) Date: Dec. 7, 2018

(87) PCT Pub. No.: WO2017/212034
PCT Pub. Date: Dec. 14, 2017

(65) Prior Publication Data
US 2019/0160586 A1    May 30, 2019

(30) Foreign Application Priority Data

Jun. 9, 2016   (EP) .................................... 16173623

(51) Int. Cl.
| | |
|---|---|
| *B23K 11/11* | (2006.01) |
| *B23K 11/00* | (2006.01) |
| *B23K 11/30* | (2006.01) |
| *B23K 35/02* | (2006.01) |
| *B23K 103/04* | (2006.01) |
| *B23K 103/10* | (2006.01) |

(52) U.S. Cl.
CPC ........... *B23K 11/115* (2013.01); *B23K 11/002* (2013.01); *B23K 11/30* (2013.01); *B23K 35/0205* (2013.01); *B23K 2103/05* (2018.08); *B23K 2103/10* (2018.08)

(58) Field of Classification Search
CPC ....... B23K 11/00; B23K 11/11; B23K 11/115; B23K 11/002; B23K 11/30; B23K 11/20; B23K 35/0261; B23K 35/0205; B23K 2103/05; B23K 2103/10
USPC ......................................................... 219/91.2
See application file for complete search history.

(56) References Cited

U.S. PATENT DOCUMENTS

| | | | |
|---|---|---|---|
| 4,652,714 A * | 3/1987 | Mergey ................ | B23K 11/063 |
| | | | 219/83 |
| 5,783,794 A * | 7/1998 | Oikawa ................ | B23K 11/115 |
| | | | 219/118 |
| 9,010,218 B2 * | 4/2015 | Peterson ................ | B44B 5/026 |
| | | | 101/28 |

(Continued)

FOREIGN PATENT DOCUMENTS

| | | |
|---|---|---|
| JP | 6254685 A | 9/1994 |
| KR | 1020150125458 A | 11/2015 |

*Primary Examiner* — Eric S Stapleton
(74) *Attorney, Agent, or Firm* — The Webb Law Firm

(57) ABSTRACT

A resistance spot welding electrode for forming dissimilar welded lap joints in crash-relevant structural components of the automotive industry made of high-strength materials. The resistance spot welding electrode includes a cap having, at an end portion of the electrode in contact with materials to be welded together during welding, a non-axially symmetrical contact area in order to form, between the materials being welded, a weld nugget with an essentially similar non-axially symmetrical shape.

16 Claims, 3 Drawing Sheets

(56) References Cited

U.S. PATENT DOCUMENTS

| | | | | |
|---|---|---|---|---|
| 9,839,971 B2* | 12/2017 | Schroth | ................. | B23K 11/34 |
| 10,010,966 B2* | 7/2018 | Yang | ................. | B23K 11/3009 |
| 10,166,627 B2* | 1/2019 | Sigler | ................ | B23K 35/0261 |
| 2006/0157452 A1* | 7/2006 | Karakas | ............... | B23K 31/125 |
| | | | | 219/110 |
| 2008/0078749 A1 | 4/2008 | Sigler et al. | | |
| 2009/0255908 A1 | 10/2009 | Sigler et al. | | |
| 2011/0094999 A1 | 4/2011 | Schroth et al. | | |
| 2012/0021240 A1* | 1/2012 | Urushihara | ........ | B23K 11/3009 |
| | | | | 428/594 |
| 2013/0341306 A1* | 12/2013 | Kinefuchi | .......... | B23K 35/0266 |
| | | | | 219/74 |
| 2014/0319105 A1 | 10/2014 | Vanimisetti et al. | | |
| 2015/0096962 A1* | 4/2015 | Sigler | ................ | B23K 35/0261 |
| | | | | 219/91.2 |
| 2015/0136742 A1* | 5/2015 | Morita | ............... | B23K 11/3009 |
| | | | | 219/110 |
| 2015/0231729 A1 | 8/2015 | Yang et al. | | |
| 2018/0304396 A1* | 10/2018 | Yoshinaga | ......... | B23K 11/0026 |

\* cited by examiner

RESISTANCE SPOT WELDING ELECTRODE AND USE OF THE ELECTRODE

CROSS-REFERENCE TO RELATED APPLICATIONS

This application is the United States national phase of International Application No. PCT/EP2017/064143 filed Jun. 9, 2017, and claims priority to European Patent Application No. 16173623.6 filed Jun. 9, 2016, the disclosures of which are hereby incorporated in their entirety by reference.

BACKGROUND OF THE INVENTION

Field of the Invention

The present invention relates to a resistance spot welding electrode to be used with high-strength metallic materials, such as aluminium, austenitic stainless steels or carbon steels, in crash-relevant structural components.

Description of Related Art

Crash-relevant structural components of automotive industry, such as b-pillars, are manufactured as a shell-construction of different dissimilar sheets and then spot-welded together with resistance spot welding process. High-strength press-hardening steel grades, such as 22MnB5, which is alloyed with boron and a high carbon content of 0.22-0.25 weight %, are used for the outer shell of the b-pillar. The result is high ultimate strength $R_m$ of 1500 MPa, but a decreased weldability. During crash tests it is noticed in spot-welds decreased cross tensile forces and brittle failure behavior, which results in a non-acceptable critical "zipper" behavior of the complete b-pillar. For the inner shell of the b-pillar it is used ductile materials to absorb the crash energy and to increase the passenger safety. Especially for resistance spot welding in dissimilar combinations with high strength but also high carbon alloyed materials the weld nuggets show a non-acceptable fracture behavior. For the welder it is very difficult to influence the resulting spot weld quality. Reasons are the physical background of Joule's law (resistance heating) and the circumstance that for resistance welding processes a metallurgical influence by welding additives like different filler metals or a mixture of shielding gas is not possible.

In relation to other welding procedures, such as beam welding processes, it is rarely possible to adjust a controlled heat management or to create a deep welding effect into the materials. Furthermore and crucial for the resistance spot welding process, the used welding tools in electrodes are carried out with a rotationally symmetric, mostly circular contact area to the materials. As a result rotationally symmetric, mostly circular weld nuggets are shaped between the weldable sheets. With such a rotationally symmetric weld nugget, a defined and targeted deviation of the force progression is not possible. State of the art welding nuggets with a rotationally symmetric shape have limitations in their tolerable loads under cross tensile direction and especially under peeling conditions. Additionally loadings for lap joints during crash like bending moments for transverse loads or shear stresses under axial loads lower the tolerable loads of a weld nugget in a further way.

For laser beam welding seam geometries are the state of the art, but for resistance spot welding there is no solution for a defined force deflection. In resistance spot welding the electrode shafts and electrode caps are made of copper or copper alloys according to the standard DIN EN ISO 5182 to have a good current transmission with low resistance and low heat loss. At the transition points from copper to the metallic sheets, between the sheets and from the second sheet to copper, the current energy is changed to ohmic resistances. Because of that effect the transition resistance between the two sheets is by far the highest, the thermal energy is at this the highest, too. At the end the thermal energy at this point reaches the melting temperature of sheets and a spot weld nugget results.

The standard DIN EN ISO 5821 manages the geometry for standard copper-alloyed electrode caps which are used for resistance spot welding.

The US patent publication 2008/0078749 relates to a resistance welding electrode body with a round weld face for contact with a workpiece, the face being provided with concentric rings of ridges or grooves extending radially from the center of the weld face. The features of the concentric rings penetrate surface oxides or other conductivity barriers. The US patent publication 2011/0094999 describes a method for preparing a resistance spot welding electrode with a generally round cylindrical body with a cylinder axis in order to impart a visible image on a weldment. The electrode is first shaped to create a generally flat or convex-shaped workpiece contacting surface. Then portions of the workpiece contacting surface are shaped with image-forming features in order to have protrusions and/or intrusions extending above or below adjacent regions of the workpiece contacting surface such that the workpiece contacting surface imposes a visible reverse image in a weldment.

These US patent publications 2008/0078749 and 2011/0094999 will not utilize geometry for electrode caps in order to create a force deflection or to increase power transmission or crash properties in material to be welded.

The US patent publication 2014/0319105 relates to a method for forming a resistance spot weld joint in a workpiece including a first steel substrate disposed in contact with a second steel substrate to define a faying interface therebetween. The workpiece is disposed between welding electrodes which include an electrode holder and an electrode cap removably attached to the holder and having a central longitudinal axis. The cap includes a body having an end, and a welding surface that is substantially smooth and free from any grooves defined therein. The cap further includes a skirt portion extending away from the body and configured to bear against the holder. The skirt portion has a first face that is substantially parallel to the axis and spaced apart from the surface. The body has a second face interconnecting the first face and the surface, and the body tapers from the first face to the surface. The US patent publication 2014/0319105 thus describes an electrode and a manner to form a spot weld nugget.

The KR patent application 2015/0125458 relates to a spot welding electrode for controlling pressure mark so that a conductor part is pressed to a welding part of a base material, flowing a current, and a nonconductor part is coupled with the conductor part to be pressed around the welding part of the base material, while the conductor part is pressed to the welding part of the base material. The spot welding electrode in accordance to the present invention is used to minimize depth of a pressure mark on a base material. The controlling of the KR patent application 2015/0125458 has an influence to the weld nugget in a sheet direction which is not optimal for the resistance spot welding.

The US patent publication 2015/0231729 relates to a method for spot welding a workpiece including a steel workpiece and an aluminium alloy workpiece. The workpieces overlap in order to provide a faying surface interface. Electrical current is passed between steel welding electrode and the aluminium alloy welding electrode so that the electrical current is at least initially passing through the perimeter region in the aluminium alloy welding electrode so that the welding electrode has a greater current density in the steel workpiece than in the aluminium alloy workpiece. The method of the US patent publication 2015/0231729 is suitable only for a rotationally symmetric electrode shape.

SUMMARY OF THE INVENTION

The object of the present invention is to eliminate drawbacks of the prior art and to establish an improved resistance spot welding electrode to be used with high-strength metallic materials, such as aluminium, austenitic stainless steels or carbon steels, in different joined combinations. The resistance spot welding electrode of the invention will increase the power transmission of the welding nugget by creating desired seam geometry and therefore influencing the direction of load and the load dissipation/bypass into uncritical areas of the component. The essential features of the invention are enlisted in the appended claims.

In resistance spot welding a welding electrode cap is made of copper or copper alloys according to the standard DIN EN ISO 5182 to have a good current transmission with low resistance and low heat loss. According to the present invention the welding electrode is advantageously for welding parts to be used in crash-relevant structural components of automotive industry. The welding electrode cap made of copper or copper alloys is shaped in order to achieve by means of good power transmission between the materials to be welded a desired weld nugget for dissimilar welded lap joints. The welding electrode is provided in that end which is during welding in contact with materials to be welded together, with a cap, having a non-axially symmetrical contact area. The cap is placed during welding in a position to the materials to be welded so that the weld nugget achieved from welding is non-axially symmetrical to the cross direction of the welded component, which cross direction is the most presumable crash direction of the welded component. The resulting weld nugget between the welded materials then deflects in a collision case crash energy into uncritical point in the welded structure or bypasses energy into uncritical component areas. Furthermore, the non-axially symmetrical shape creates a geometry-dependent resistance for the other spot-welded points against peeling forces to avoid "zipping" of the complete flange and therefore the complete component.

Instead of that force under crash takes effect into the longitudinal direction and results in a gradually fail of every spot weld in the structure of the prior art, according to the invention force under crash is deflected to the cross direction of the welded component and results to an uncritical crack outlet from one weld nugget over a small flange, and only local uncritical failure is caused for the function of the complete component.

The non-axially symmetrical geometry of the contact area of the welding electrode cap according to the invention is a special ratio of a width, a length and a distance between the opposite ends in the desired geometry in question. The desired geometry of the welding electrode cap can be essentially all geometries with a distinct power deflection. The contact area may have at least one web portion extending at an angle to a longitudinal axis of the contact area and at least one shank portion extending from the web portion in a direction parallel to or at an angle to the longitudinal direction, where the direction in which the second portion extends is different from the direction in which the web portion extends. The web portion has a width dimension referred to herein as the web width and a length dimension referred to herein as the web length. These kinds of shapes are modified or unmodified C, T, L or S shapes, modified or unmodified crescent, clamp or bracket shapes. Further, suitable shapes are a modified or unmodified combination of a classical point with a web portion, and modified or unmodified W or H shapes when the modified or unmodified W and H shapes are toppled in cross direction.

During welding the welding electrode cap is oriented to the material to be welded so that a part of the non-axially symmetrical cap, which is essentially parallel with the longest dimension of the welded structure, is positioned close to the opposite edge of the welded structure in the most presumable crash direction. It is also possible to position the part of the non-axially symmetrical cap which is essentially parallel with the longest dimension of the welded structure close to the first edge of the welded structure in the most presumable crash direction.

The dimension of the geometry used in the non-axially symmetrical resistance spot welding electrode cap according to the invention is also important for the possibility to absorb the first dynamic impact during a crash situation or to avoid undesirable peeling behavior of the other spot welds. Further, the circumferential dimension and the area dimension are also important parameters, such as the web width w of the cap and the web length 1 of the cap. The web width refers to an desired weld seam width in relation to the available flange dimensions of the component. The web length 1 refers to the distance between the level congruent to the one end of the cap and the point of the cap which is furthermost from that level in transverse direction of the component flange.

The web width w should be not smaller than 1.5 mm and not greater than 5 mm, otherwise weld spatters appear before the weld nugget is formed completely. The preferred web width w is between 2.5 and 3.5 mm what avoids welding spatters with usual welding current 4-8.5 kA depending on the material or material combination on one side. On the other side a web width, which is too big, results in the same behavior as a traditional, rotational symmetry electrode cap with its limited power transmission and limited possibility for targeted load dissipation. Therefore one geometrical characteristic is the ratio of the web length 1 to the web width w, which ratio l/w is greater than 2.0, preferred between 2.5 and 4.0, but smaller than 6.0. The ratio guarantees, that a crack can bypass into the targeted uncritical component areas, for example to the longitudinal edge side of a flange. The upper limitation results from the frame condition to use typical flange width of automotive structural components which are between 15 and 25 mm. The orientation of the web length, which can be termed also as "shank", must be nearly vertical) (75-90° to the component longitudinal direction (for example the flange width). Moreover, in the geometrical transition zones a radius r can be defined. The lower limitation is equal to the web width to avoid local hot-spots which result in undesirable weld spatters. Further, a distance d is required when the cap is built up or combined with a traditional, axially symmetrical area and a non-axially symmetrical area. The distance d is a length into the longitudinal direction of the component and refers to the distance between the end of the axially symmetrical area and the beginning of dissipating element or part into the transverse side of the flange. It is necessary to dissipate the force, otherwise the traditional behavior can be determined in such a combination. Therefore, the distance d should be 2 times or more than the web width w.

The weld nugget achieved with the non-axially symmetrical welding electrode cap according to the invention has essentially the similar non-axially symmetrical shape. The non-axially symmetrical shape of the weld nugget causes in a collision case the force to defect to the cross direction in the welded structure.

According to one embodiment of the invention it is also possible to combine on one metal sheet contact area a non-axially symmetrical electrode cap and on the other sheet metal contact area a prior art axially symmetrical cap. The resulting weld nugget fulfills the before mentioned requirements, what means that the resulting weld nugget is non-axially symmetrical.

One additional benefit of the present invention is that in the prior art it is not possible to combine a seam joining method with bonding, it works only with spot-welding what is called weldbonding. With the present invention it is now possible to create resistance welded seam by using at the same time adhesive materials for a combined joining way.

The resistance spot welding electrode with non-axially symmetrical welding electrode cap according to the invention is used for welding high strength materials, such as, carbon steels and stainless steels defined by yield strength more than 400 MPa, and the carbon content is in the resulting dissimilar weld nugget more than 0.15 weight %. Other limited weldable high strength materials, where the non-axially symmetrical welding electrode cap according to the invention can be used, are high strength aluminium alloys, such as 5xxx, 6xxx or 7xxx series.

The non-axially symmetrical welding electrode cap according to the invention can be in addition to B-pillar utilized in general for all crash-relevant parts in automotive industry, such as a door side impact member, A-pillar, crashbox bumper, reinforcement plates or a rocket rail. It is also possible to use the present invention in other solution fields than automotive industry, which uses lap joints as a joining situation, such as driver's cabs of trucks, railway construction parts, battery packs for battery electric vehicles or hybrid and pressure resistance tanks, or white good applications like trammel, inner door of a dish washer.

BRIEF DESCRIPTION OF THE DRAWINGS

The present invention is illustrated in more details referring to the following drawings where.

DESCRIPTION OF THE INVENTION

Figure 1:
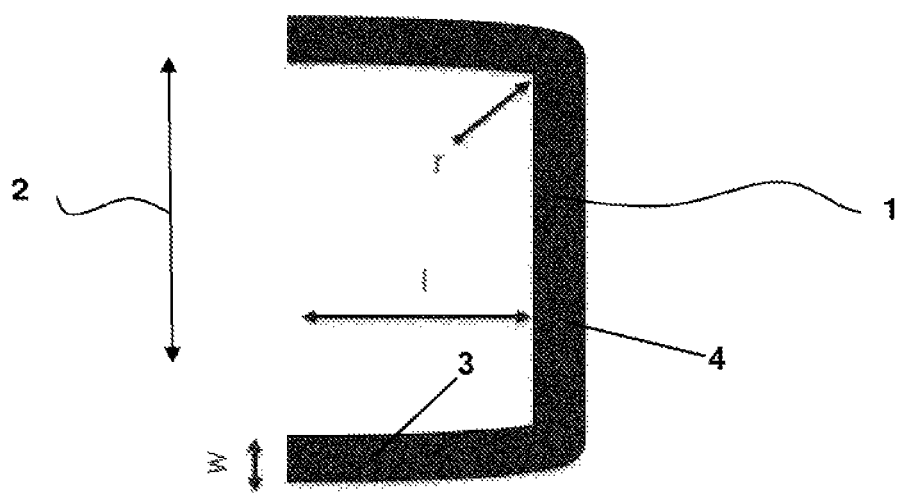
FIG. 1 shows one preferred embodiment of the invention schematically seen from the top view.

FIG. 1 illustrates the contact area on an end of a resistance spot welding electrode cap 1 which is during welding in contact with the materials to be welded and has a shape of a modified C letter rotated 180 degrees. The cap 1 is non-axially symmetrical in the vertical direction. In FIG. 1, the contact area of the cap 1 has two web portions 3 extending at an angle to a longitudinal axis of the contact area and a shank portion 4 extending from the web portions 3 in a direction parallel the longitudinal direction, the web portion has a width dimension w, a length dimension 1 and a radius r in the geometrical transition zone between the web portion 3 and the shank portion 4. The cap 1 is positioned with respect to the components to be welded so that the longitudinal direction of the components are illustrated by an arrow 2.

Figure 2:
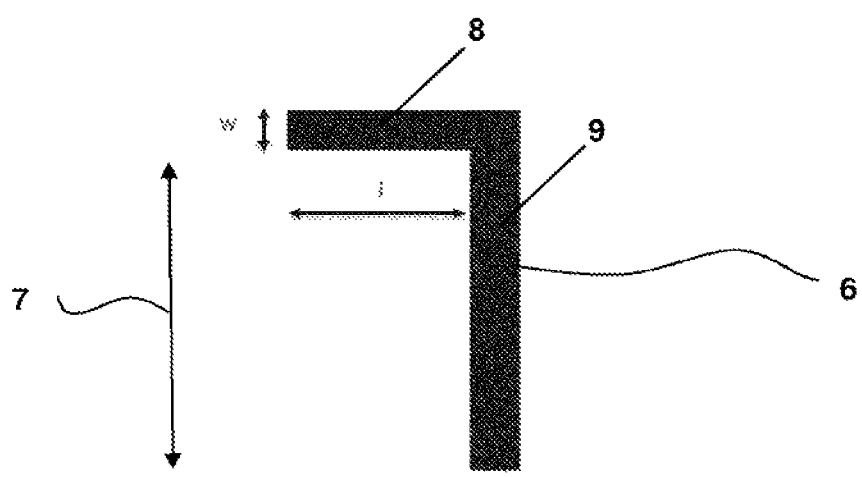
FIG. 2 shows another preferred embodiment of the invention schematically seen from the top view.

FIG. 2 illustrates the contact area on an end of a resistance spot welding electrode cap 6 which is during welding in contact with the materials to be welded and has a shape of an unmodified L letter rotated 180 degrees. The cap 6 is non-axially symmetrical in the vertical direction. In FIG. 2, the contact area of the cap 6 has a web portion 8 extending at an angle to a longitudinal axis of the contact area and a shank portion 9 extending from the web portion 8 in a direction parallel the longitudinal direction, the web portion has a width dimension w and a length dimension 1. The cap 6 is positioned with respect to the components to be welded so that the longitudinal direction of the components are illustrated by an arrow 7.

Figure 3:
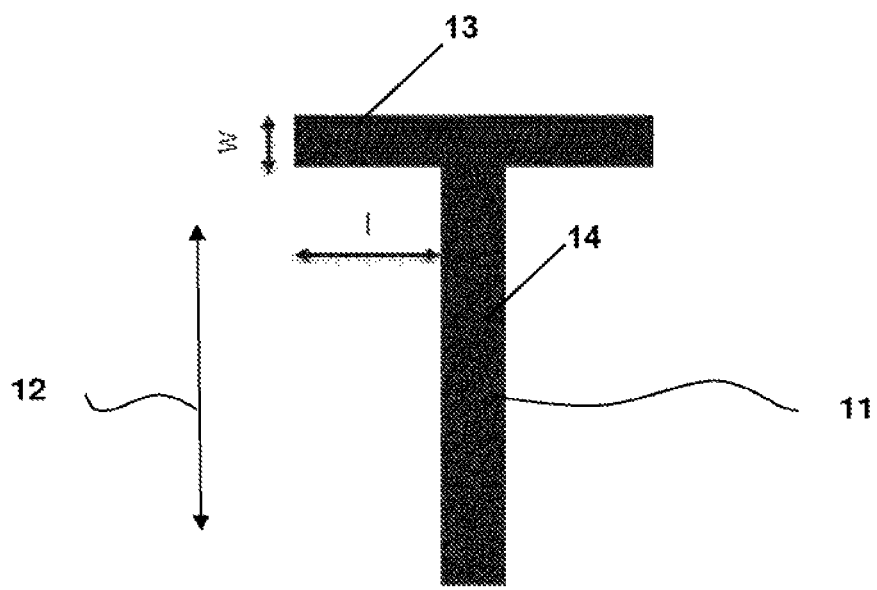
FIG. 3 shows still another preferred embodiment of the invention schematically seen from the top view.

FIG. 3 illustrates the contact area on an end of a resistance spot welding electrode cap 11 which is during welding in contact with the materials to be welded and has a shape of an unmodified T letter. The cap 11 is non-axially symmetrical in the vertical direction. In FIG. 3, the contact area of the cap 11 has a web portion 13 extending at an angle to a longitudinal axis of the contact area and a shank portion 14 extending from the web portion 13 in a direction parallel the longitudinal direction, the web portion has a width dimension w and a length dimension 1. The cap 11 is positioned with respect to the components to be welded so that the longitudinal direction of the components are illustrated by an arrow 12.

Figure 4:
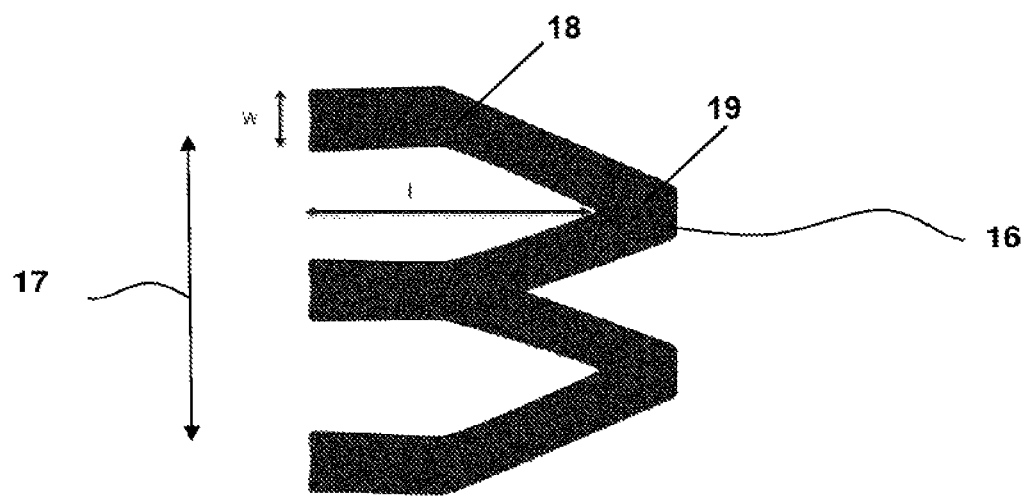
FIG. 4 shows further another preferred embodiment of the invention schematically seen from the top view.

FIG. 4 illustrates the contact area on an end of a resistance spot welding electrode cap 16 which is during welding in contact with the materials to be welded and has a shape of an unmodified W letter rotated 90 degrees. The cap 16 is non-axially symmetrical in the vertical direction. In FIG. 4, the contact area of the cap 16 has a web portion 18 extending at an angle to a longitudinal axis of the contact area and a shank portion 19 extending from the web portion 18 in a direction parallel the longitudinal direction, the web portions have a width dimension w and a length dimension 1. The cap 16 is positioned with respect to the components to be welded so that the longitudinal direction of the components are illustrated by an arrow 17.

Figure 5:
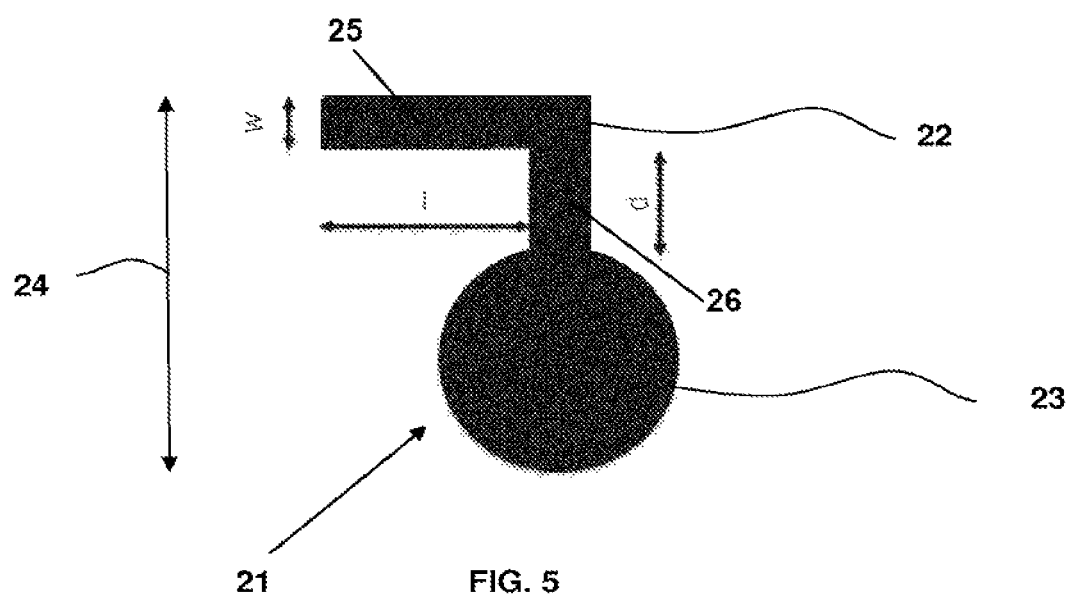
FIG. 5 shows one another preferred embodiment of the invention schematically seen from the top view.

In accordance with FIG. 5 the contact end on an end of a resistance spot welding electrode cap 21 which is during welding in contact with the materials to be welded is a shape of a modified combination of a non-axially symmetrical area 22 and an axially symmetrical area 23. The non-axially symmetrical area 22 comprises a web portion 25 extending at an angle to a longitudinal axis of the contact area and a shank portion 26 extending from the web portion 25 in a direction parallel the longitudinal direction. The cap 21 is non-axially symmetrical in the vertical direction and, therefore, in order to achieve a desired weld nugget in accordance with the invention the cap 21 is positioned during welding in the transverse direction to the material to be welded. In FIG. 5, the contact area of the cap 21 has the web portion 24 with a width dimension w and a length dimension 1 and a distance d between the traditional, prior art axially symmetrical area 23 and the non-axially symmetrical area 22. The cap 21 is positioned with respect to the components to be welded so that the longitudinal direction of the components are illustrated by an arrow 24.

The invention claimed is:

1. A method of welding with a resistance spot welding electrode including:
   providing a resistance spot welding electrode having a cap configured to be in contact with materials to be welded together, wherein the cap has a non-axially symmetrical contact area comprising at least one shank portion extending in a first direction with respect to a surface of the cap and at least one web portion extending in a second direction with respect to the surface of the cap, wherein the second direction intersects the first direction;
   overlapping at least a portion of the materials to be welded;
   positioning the contact area of the electrode in contact with the overlapped portion of the materials to be welded together; and
   welding the materials together by applying a current through the electrode and into the materials, and
   wherein, before welding, the overlapped portions of the materials are not joined to one another, and after welding, the materials are joined by a weld having a similar non-axially symmetrical shape with respect to the surfaces of the materials as the cap.

2. The method according to claim 1, wherein the at least one web portion extends at an angle to a longitudinal axis of the contact area and a width dimension in the first direction and a length dimension in a direction that is substantially perpendicular to the first direction.

3. The method according to claim 2, wherein a ratio of the length dimension to the width dimension of the at least one web portion of the contact area is bigger than 2.0, but smaller than 6.0.

4. The method according to claim 3, wherein a ratio of the length dimension to the width dimension of the at least one web portion is bigger than 2.5 but smaller than 6.0.

5. The method according to claim 2, wherein the second direction is oriented at a 75-90° angle to the first direction.

6. The method according to claim 2, wherein a web width of the at least one web portion is not smaller than 1.5 mm and not greater than 5.0 mm.

7. The method according to claim 2, wherein the at least one shank portion extends in a direction parallel to or at an angle to the longitudinal axis of the contact area.

8. The method according to claim 1, wherein the non-axially symmetrical contact area has a modified or unmodified C, T, L or S shape.

9. The method according to claim 1, wherein the non-axially symmetrical contact area has a modified or unmodified crescent, clamp or bracket shape.

10. The method according to claim 1, wherein the non-axially symmetrical contact area further comprises a substantially circular portion.

11. The method according to claim 1, wherein the non-axially symmetrical contact area has a modified or unmodified W or H shape.

12. The method according to claim 1, wherein the materials comprise carbon steel, stainless steel with a yield strength greater than 400 MP, or an aluminium alloy.

13. The method according to claim 1, wherein the welded materials form a crash-relevant part for automobiles, a crash-relevant part for trucks, a railway construction part, a battery pack for battery electric or hybrid vehicles, a pressure resistant tank, or a white good product.

14. The method according to claim 1, wherein the materials to be welded are structural components, the at least one web portion extends at an angle to a longitudinal axis of the contact area, the at least one shank portion extends in a direction parallel to or at an angle to the longitudinal axis of the contact area, and the contact area is positioned with respect to the structural components such that the at least one shank portion is essentially parallel with a longest dimension of the structural components and is positioned close to an edge of the structural components.

15. The method of claim 1, wherein the materials are structural components.

16. The method of claim 1, wherein the materials comprise dissimilar materials.

* * * * *

UNITED STATES PATENT AND TRADEMARK OFFICE
CERTIFICATE OF CORRECTION

| | | |
|---|---|---|
| PATENT NO. | : 12,172,225 B2 | Page 1 of 1 |
| APPLICATION NO. | : 16/308112 | |
| DATED | : December 24, 2024 | |
| INVENTOR(S) | : Hündgen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this
Thirteenth Day of May, 2025

Coke Morgan Stewart
*Acting Director of the United States Patent and Trademark Office*